US006425003B1

(12) United States Patent
Herzog et al.

(10) Patent No.: US 6,425,003 B1
(45) Date of Patent: Jul. 23, 2002

(54) METHOD AND APPARATUS FOR DNS RESOLUTION

(75) Inventors: Theodore Thomas Herzog, Tustin; Jie Chu, Los Altos; Xi Xu, Milpitas, all of CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/235,940

(22) Filed: Jan. 22, 1999

(51) Int. Cl.$^7$ ................................................ G06F 13/00
(52) U.S. Cl. ...................................... 709/223; 709/203
(58) Field of Search ................................. 709/203, 223

(56) References Cited

U.S. PATENT DOCUMENTS

| | | | |
|---|---|---|---|
| 5,241,594 A | 8/1993 | Kung | 380/4 |
| 5,570,361 A | 10/1996 | Norizuki et al. | 370/395 |
| 5,617,421 A | 4/1997 | Chin et al. | 370/402 |
| 5,655,077 A | 8/1997 | Jones et al. | 713/201 |
| 5,671,354 A | 9/1997 | Ito et al. | 713/201 |
| 5,684,950 A | 11/1997 | Dare et al. | 713/201 |
| 5,699,521 A | 12/1997 | Iizuka et al. | 709/240 |

(List continued on next page.)

FOREIGN PATENT DOCUMENTS

WO          99/53408          10/1999

OTHER PUBLICATIONS

Carrel, D., et al., The TACACS+ Protocol, Version 1.78, Cisco Systems, Inc., printed from ftp://ftp-eng.cisco.com/gdweber/tac-rfc.1.78.txt on Oct. 23, 2000.

Cisco Systems, Inc., "CiscoDNS/DHCP Manager V.1.1", printed from http://www.combinent.com/warp/public/751/dnsmg/dnsmg$_{13}$ ds.htm, on Sep. 10, 1998, 4 pages.

Cisco Systems, Inc., "Cisco DNS/DHCP Manager V.1.1", printed from http://www.combinet.com/warp/public/751/dnsmg/dnsmg__pa.htm, on Sep. 10, 1998, 7 pages.

Cisco Systems, Inc., "DHCP Solution Helps Scale and Configure IP Nodes in Growing Switched Networks", printed from http://cio.cisco.co.jp/warp/public/795/6.html, on Sep. 10, 1998, 2 pages.

Cisco Systems, Inc., "Cisco DNS/DHCP Manager", printed from http://mwrns.noaa.gov/cisco/cc/td/doc/resprdct/res31.htm, on Sep. 10, 1998, 4 pages.

(List continued on next page.)

*Primary Examiner*—Kenneth R. Coulter
(74) *Attorney, Agent, or Firm*—Thelen Reid & Priest LLP; David B. Ritchie

(57) ABSTRACT

A method and apparatus for resolving where to forward DNS (domain name service) requests for a user simultaneously logged into more than one service existing on a data communications network utilizes an active service list (ASL) to keep track of the services that the user is currently logged into. The active service list includes a list of services sorted in a particular order based on information about the service and sometimes the order in which the user logged into the services. Each service has a profile that defines, among other things, the IP Address space for the service and a Domain attribute. To determine the appropriate service and, therefore, the appropriate DNS server for a DNS request, the QName from the DNS request is compared to the configured Domain attribute(s) for each service in the order of the ASL. If a match is found, then the DNS request packet is modified to re-direct the DNS request to the DNS server configured for the matched service. If no domain match is found and the user is logged into an Internet Service, then the DNS request packet is modified to re-direct the DNS request to the DNS server configured for the first Internet Service found in the user's ASL. If no domain match is found and the user is not logged into an active Internet Service, then the DNS request is not re-directed, but rather forwarded unmodified.

27 Claims, 3 Drawing Sheets

U.S. PATENT DOCUMENTS

| | | | |
|---|---|---|---|
| 5,793,763 A | | 8/1998 | Mayes et al. .................. 370/389 |
| 5,854,901 A | * | 12/1998 | Cole et al. .................... 709/245 |
| 5,884,038 A | * | 3/1999 | Kapoor ......................... 709/226 |
| 5,944,824 A | | 8/1999 | He ................................ 713/201 |
| 5,959,990 A | | 9/1999 | Frantz et al. ................. 370/392 |
| 5,974,453 A | | 10/1999 | Andersen et al. ............ 709/220 |
| 5,983,270 A | * | 11/1999 | Abraham ..................... 709/224 |
| 5,991,810 A | | 11/1999 | Shapiro et al. ............... 709/229 |
| 6,009,103 A | | 12/1999 | Woundy ....................... 370/401 |
| 6,011,910 A | | 1/2000 | Chau et al. ................... 709/229 |
| 6,021,496 A | | 2/2000 | Dutcher et al. .............. 713/202 |
| 6,023,724 A | * | 2/2000 | Bhatia ........................... 709/218 |
| 6,026,441 A | | 2/2000 | Ronen .......................... 709/227 |
| 6,047,376 A | | 4/2000 | Hosoe .......................... 713/201 |
| 6,091,951 A | | 7/2000 | Sturniolo et al. ............ 455/432 |
| 6,092,178 A | | 7/2000 | Jindal et al. ................... 712/27 |
| 6,092,196 A | | 7/2000 | Reiche ......................... 713/200 |
| 6,119,160 A | | 9/2000 | Zhang et al. ................. 709/224 |
| 6,130,892 A | | 10/2000 | Short et al. ................... 370/401 |
| 6,141,687 A | | 10/2000 | Blair ............................. 709/225 |
| 6,205,489 B1 | * | 3/2001 | Kapoor ......................... 709/245 |
| 6,324,585 B1 | * | 11/2001 | Zhang et al. ................. 709/245 |

OTHER PUBLICATIONS

Network Registrar, "Hot Products & Solutions", American Internet Corporation, printed from http://www.american.com/networkregistrar, html, on Jul. 24, 1998.

"Three Ways to Manage IP Addresses", PC Magazine: IP Address Management, printed from http://www.zdnet.com/pcmag/features/ipmanage/ip–s2.htm, on Sep. 10, 1998.

* cited by examiner

HOST OBJECT

```
ID: USER A
SERVICE LIST:   S₁ ⎤
                S₂ ⎬ 26
                S₃ ⎦
ACTIVE SERVICE LIST:  S₃ ⎤ 28
                      S₁ ⎦
```

SERVICE OBJECT

```
ID: S₁

CORPA.COM
1.2.3.254 (DNS SERVER TO USE)
1.2.3.0;255.255.255.0
1.3.0.0;255.255.0.0    (ADDRESS SPACE)
```

METHOD AND APPARATUS FOR DNS RESOLUTION

BACKGROUND OF THE INVENTION

1. Field of the Invention

The present invention relates to the field of data communications networks. More particularly, this invention relates to a method and apparatus for resolving Domain Name Service requests in a data communications network.

2. The Background

The Service Selection Gateway (SSG) is a product which allows data communications network users to select and login to services available on the data communications network. These services can include computer intranets, pay per use sites, the Internet, community of interest services and the like. The SSG permits a user to simultaneously log in to a plurality of such services, even if they have overlapping IP address space.

Each service to which a user may be connected has an associated IP (Internet Protocol) address space. That is, a certain range of addresses may address that space. The range may be contiguous, discontiguous, or a combination of both. For example, Corp A may have an intranet service having all IP addresses which start with "10.1"—this may be denoted "10.1.x.x" where x can be any value. It may also be denoted "10.1.0.0; 255.255.0.0" where "10.1.0.0" represents the IP address and "255.255.0.0"represents the subnet mask. Those of skill in the art will recognize that a 255 in the subnet mask field represents a binary 1111 1111 and amounts to a requirement that the corresponding field of the IP address must match bit for bit in order to achieve a match. On the other hand, a 0 in the subnet mask field represents a binary 0000 0000 and amounts to no requirement for any match. For example, a service having an address space of "0.0.0.0; 0.0.0.0" represents the Internet, i.e., all IP addresses are within this space. Note that since the subnet mask is 0.0.0.0 the IP address could be set to any value and it would yield the same result.

In data communications networks a domain name service (DNS) is used to resolve textual domain name strings, such as "CORPA.COM", into numerical IP addresses which can be used to route packets to and from such domains. A DNS system typically includes a hierarchy of DNS servers distributed throughout the network. A DNS request is generated, for example, by a user running an Internet browser application program on a computer. The DNS request is then forwarded to a DNS server associated with the user's account as often determined by settings set in software (typically the user's operating system) by the user. If the DNS request can be handled at that level, the numerical IP address is passed back to the user's application. If not, the request is passed to a superior DNS service, and so on.

Where the user is logged into more than one service, more than one DNS service may be available to service the user's DNS requests. This leads to a conflict. In some cases one of the DNS services will be "better" to use than another in that it may be more likely to quickly resolve the DNS request, however, the settings in the user's operating system may undesirably direct the DNS request packet to the "wrong" DNS service. Accordingly, it would be desirable to provide a method and apparatus for resolving where to forward DNS requests from a user with more than one concurrent service connection on a data communications network.

SUMMARY OF THE INVENTION

A method and apparatus for resolving where to forward DNS (domain name service) requests for a user simultaneously logged into more than one service existing on a data communications network utilizes an active service list (ASL) to keep track of the services that the user is currently logged into. The active service list includes a list of services sorted in a particular order based on information about the service and sometimes the order in which the user logged into the services. Each service has a profile that defines, among other things, the IP Address space for the service and a Domain attribute. To determine the appropriate service and, therefore, the appropriate DNS server for a DNS request, the QName from the DNS request is compared to the configured Domain attribute(s) for each service in the order of the ASL. If a match is found, then the DNS request packet is modified to re-direct the DNS request to the DNS server configured for the matched service. If no domain match is found and the user is logged into an Internet Service, then the DNS request packet is modified to re-direct the DNS request to the DNS server configured for the first Internet Service found in the user's ASL. If no domain match is found and the user is not logged into an active Internet Service, then the DNS request is not re-directed, but rather forwarded unmodified.

DETAILED DESCRIPTION OF THE PREFERRED EMBODIMENTS

Those of ordinary skill in the art will realize that the following description of the present invention is illustrative only and not in any way limiting. Other embodiments of the invention will readily suggest themselves to such skilled persons after a perusal of the within disclosure.

In accordance with a presently preferred embodiment of the present invention, the components, processes and/or data structures are implemented using a gateway device and other services implemented using C++ programs running on IBM compatible personal computer device running Vx Works available from Wind River Systems of Alameda, Calif. as its operating system. Different implementations may be used and may include other types of operating systems, computing platforms, computer programs, firmware and/or general purpose machines. In addition, those of ordinary skill in the art will readily recognize that devices of a less general purpose nature, such as hardwired devices, devices relying on FPGA (field programmable gate array) or ASIC (Application Specific Integrated Circuit) technology, or the like, may also be used without departing from the scope and spirit of the inventive concepts disclosed herein.

The service selection gateway (SSG or gateway) is a device which couples the user via a network access server (NAS) or other conventional means to the data communications network. The term gateway is not meant to be limited to a single type of device, as any device, hardware or software, that may act as a bridge between the user and the network may be considered a gateway for the purposes of this application. In accordance with a presently preferred embodiment of the present invention, the SSG is a device available from Cisco Systems, Inc. of San Jose, Calif.

Figure 1:
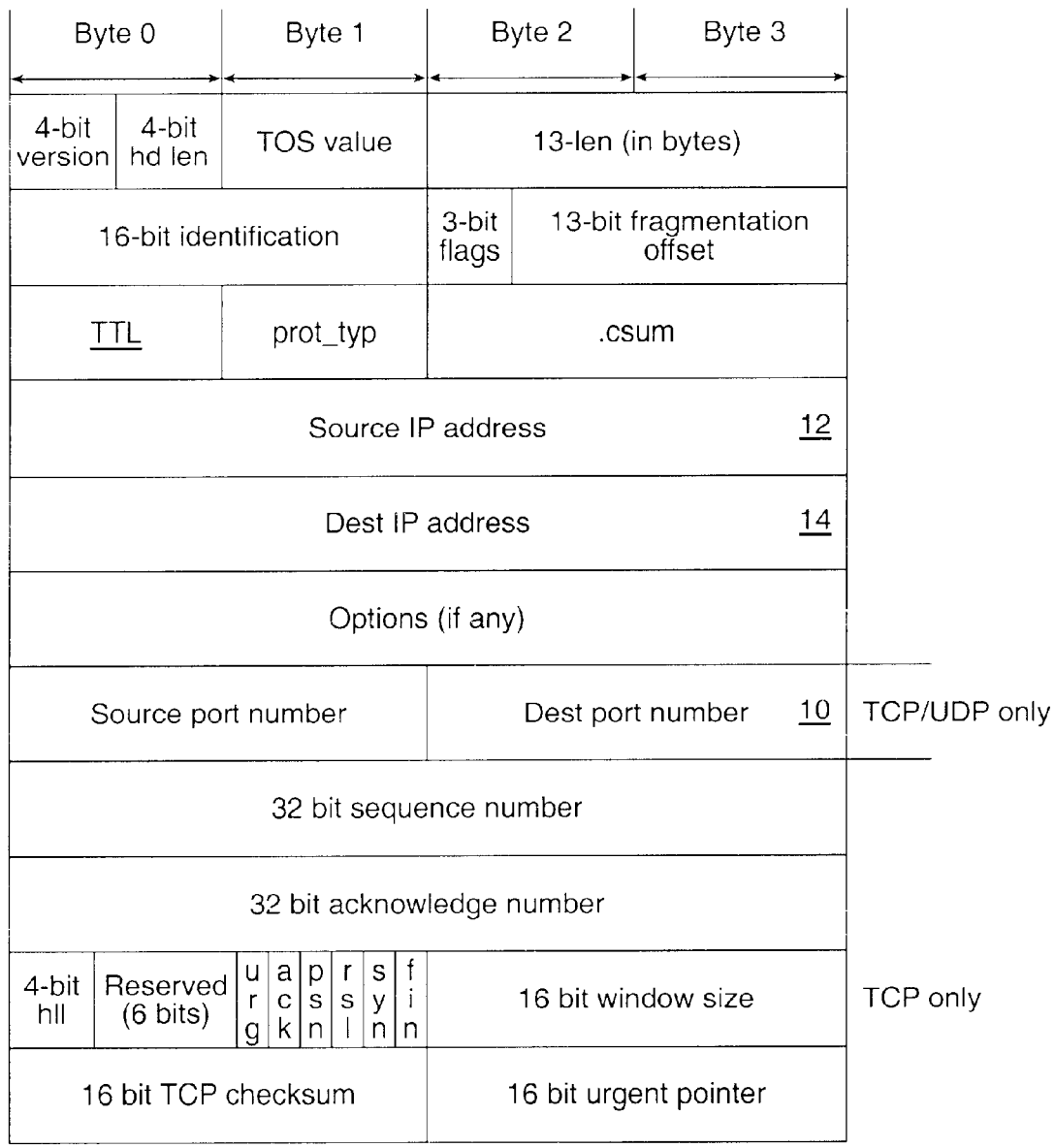
FIG. 1 is a diagram of an IP version 4 packet header.

FIG. 1 is a diagram of an IP version 4 (IP) packet header. A DNS request packet is an IP packet having an IP header where the Layer 4 destination port number 10 is set to 53 decimal. Any value could be used, but by the standards presently in use 53 is the designator for a DNS request packet. Typically an application program running on the user's computer will generate the DNS request packet in response to encountering a textual domain name such as "CORPA.COM". The user's application program will set the Source IP address field 12 to the user's IP address (which may be dynamically assigned as well known to those of ordinary skill in the art) and will set the destination IP address 14 to that of the DNS server that the user's operating system is configured to use.

Those of ordinary skill in the art will recognize that this invention will work with packet transmission protocols other than IP version 4 and that IP version 4 is merely used as an example herein.

Figures 2, 3A, 3B:
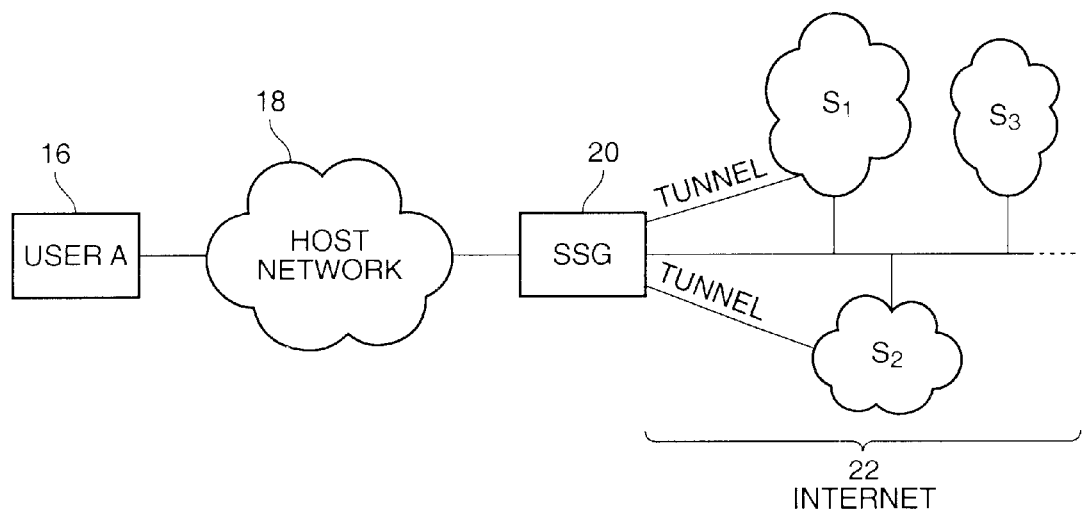
FIG. 2 is a system block diagram of a typical data communications network.
FIG. 3A is a diagram illustrating a host object in accordance with a presently preferred embodiment of the present invention.
FIG. 3B is a diagram illustrating a service object in accordance with a presently preferred embodiment of the present invention.

FIG. 2 is a diagram of a typical network configuration where a user utilizes an SSG or its equivalent to obtain simultaneous access to more than one service. User A 16 is connected to a host network 18. The connection may be by telephone into a network access server (NAS) or by local area network connection or by other connecting means known to those of skill in the art.

The host network 18 is connected to the SSG 20. The SSG, in turn, is connected to a larger data communications network 22 such as the Internet having a plurality of services $S_1$, $S_2$ and $S_3$ associated with it. SSG 20 preferably creates tunneling connections such as Layer 2 tunneling protocol (L2TP) connections with services $S_1$, $S_2$ and $S_3$ as required by users.

SSG 20 maintains a database of "host objects" for each user. For example, User A (16) has a host object in or associated with SSG 20 which preferably includes a service list containing a list of services to which user A is subscribed and an Active Service List (ASL) containing a list of services to which User A is currently connected or logged into. SSG 20 also preferably maintains in memory a service object for each active service. Each entry in the active service list is a pointer to a service object.

FIG. 3 is a diagram showing the organization of a host object 24 associated with User A (16). The host object contains a list of services to which User A is subscribed 26. The service list 26 preferably contains only pointers to the service objects corresponding to the services to which the user is subscribed.

The host object also contains an ASL 28 which preferably contains only pointers to the service objects corresponding to the active services to which User A is logged in.

A service object, as diagrammed in FIG. 3B, preferably contains an identification value, one or more domain name strings, corresponding IP address space, typically denoted with an IP address and subnet mask. The address range may consist of a single address and subnet mask, i.e., 1.2.0.0; 255.255.0.0, multiple address ranges and subnet masks, and/or an internet service identification, e.g., 0.0.0.0; 0.0.0.0. Also included are at least one DNS service address to use with the service. This is a minimum; other information could be contained as desired in the service object.

Where a user is logged into multiple services, such as an Internet Service Provider (ISP) and an intranet, the user may have DNS requests which are better resolved by the DNS service associated with the ISP and other DNS requests which are better resolved by the DNS service associated with the intranet. For example, if the User A wants to contact a domain having a domain name string of "WWW.CORPA.COM" it will generally be better to direct the DNS request packet to the DNS server associated with CORPA.COM rather than some other DNS server.

In accordance with the invention, the ASL 28 is sorted based upon the number of potential IP addresses associated with each entry. First, the "largest" address range entry is selected for each entry. The "size" is determined by the subnet mask of the corresponding service found in its service object. A subnet mask of 255.255.255.255 is associated with a single IP address. A subnet mask of 0.0.0.0 is associated with every IP address. A number of subnet masks exists between those two extremes. For example, if an entry in the ASL is $S_3$ and its service object includes:

CORPA.COM, 1.2.3.254 (DNS server to use), 1.2.3.0; 255.255.255.0, 1.3.0.0; 255.255.0.0 then the "largest" address range is the second one, i.e., 1.3.0.0; 255.255.0.0.

If the other entry in the ASL is $S_1$ and its service object shows:

ISP.NET, 1.99.88.254 (DNS server to use), 1.99.88.2; 255.255.255.255, 1.98.88.0; 255.255.255.0, 0.0.0.0; 0.0.0.0 then the "largest" address range is the third one, 0.0.0.0; 0.0.0.0 corresponding to full Internet Access. (Realistically, however, most Internet Services would be configured only with the address range 0.0.0.0;0.0.0.0—this is an example only).

Since the "ISP.NET" entry is "larger" than the "CORPA.COM" entry, it goes last in the ASL after sorting so that the "smaller" entries are checked first.

Now, when a DNS request packet is generated by USER A (16) and received by SSG 20, the ASL is checked to determine how to proceed.

First, the domain name associated with the request packet (the QName) is compared to the domain names of the service objects pointed to by the entries in the ASL 28. If a match, e.g., "CORPA.COM", is found, then the DNS request packet is modified so that the IP address of the DNS service associated with the match is inserted for the IP destination address of the DNS request packet. This forces the DNS request packet to be routed to the selected DNS service rather than, for example, the default DNS service selected by the user when configuring his or her operating system.

If no match is found with a domain name in the service objects pointed to by the entries in the ASL 28 but the user is logged into an Internet Service (in this example, $S_1$), then the DNS request packet is modified so that the IP address of the DNS service associated with the Internet Service is inserted for the IP destination address of the DNS request packet. This forces the DNS request packet to be routed to the selected DNS service rather than, for example, to the default DNS service selected by the user when configuring his or her operating system.

Finally, if no domain name match exists and the user is not logged into an Internet Service, then the packet is passed without modification to the original IP destination address in the DNS request packet which is whatever default DNS service the user has selected.

Figure 4:
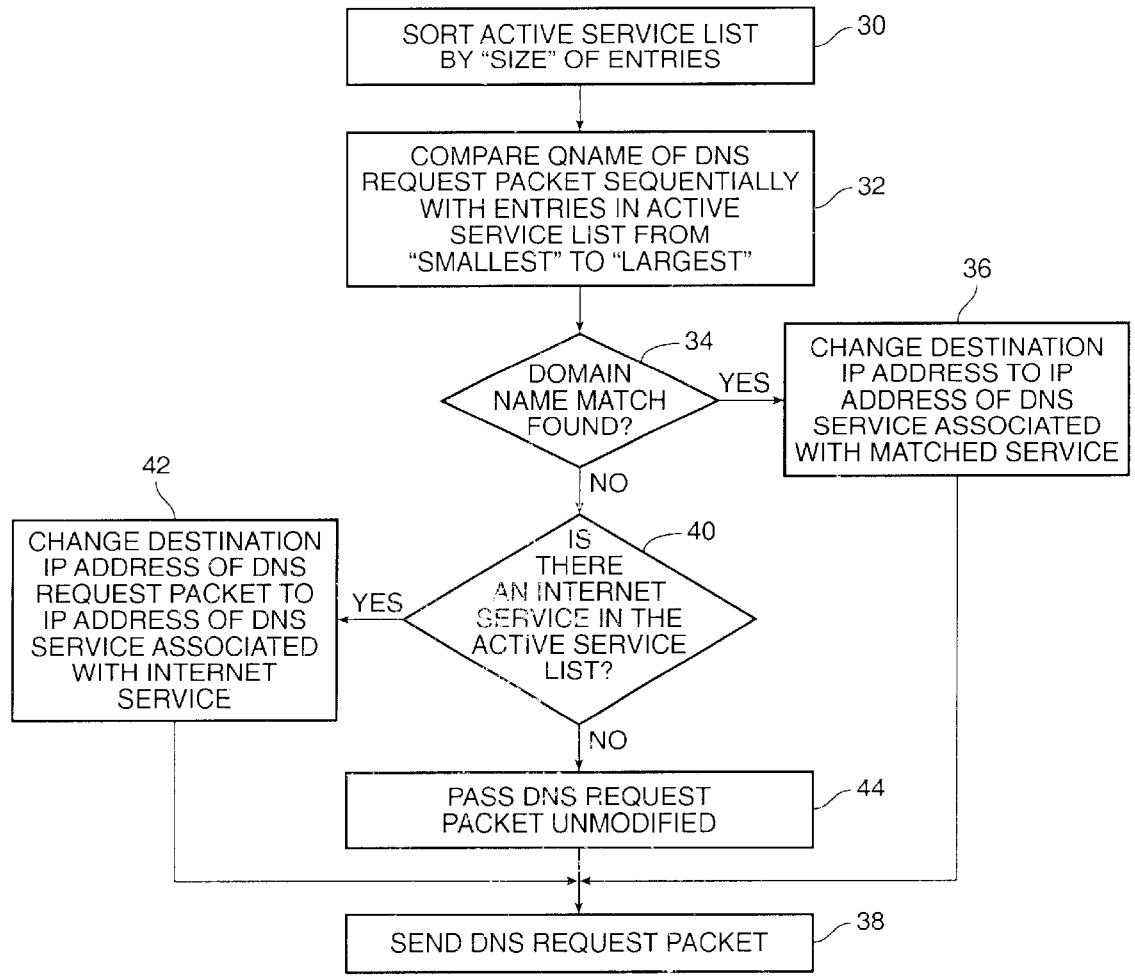
FIG. 4 is a f low chart of a method for resolving DNS service requests in accordance with a presently preferred embodiment of the present invention.

Turning now to FIG. 4, a flow chart of a method for resolving where to send DNS request packets in accordance with a presently preferred embodiment of the present invention is shown.

At reference numeral 30 the Active Service List is sorted by the "size" of the largest address range entries. One way to do this is by counting the binary "1"s in the subnet mask of the corresponding service objects, with masks having a fewer number of "1"s having a "larger" "size".

At reference numeral 32 the domain name string, e.g., "CORPA.COM", is extracted from the DNS request packet (identified by its Layer 4 destination port number) in a conventional manner. It is then compared sequentially with the entries in the Active Service List from "smallest" to "largest".

At reference number 34 if a domain name match is found, then control transfers to reference numeral 36 where the destination IP address of the DNS request packet is changed to the DNS Service IP address indicated for the matched service. Control then transfers to reference numeral 38 where the packet is transmitted. If no match is found, control transfers to reference numeral 40 where the Active Service List is checked for an Internet Service entry, i.e., one with a subnet mask of 0.0.0.0. If one is found, control transfers to reference numeral 42 where the destination IP address of the DNS request packet is changed to the DNS service IP address indicated for that service. Control then transfers to reference numeral 38 where the packet is transmitted.

If no domain name match is found and the user is not logged into an Internet Service, then the packet is left unmodified at reference numeral 44, and is transmitted at reference numeral 38.

ALTERNATIVE EMBODIMENTS

While embodiments and applications of the invention have been shown and described, it would be apparent to those of ordinary skill in the art, after a perusal of the within disclosure, that many more modifications than mentioned above are possible without departing from the inventive concepts herein. The invention, therefore, is not to be restricted except in the spirit of the appended claims.

What is claimed is:

1. A method for directing a DNS request packet comprising:
   maintaining an active service list of services to which a user is logged in, said entries in said list of services associated with a memory including a domain name for each of the services and a DNS service address to be used for each of the services;
   intercepting a DNS request packet having a QName and a destination address;
   comparing the QName to domain names associated with entries in the active service list and, if a match is detected, changing the destination address of the DNS request packet to the DNS service address to be used for the service associated with the matched domain name.

2. A method in accordance with claim 1, further comprising:
   determining if any entry in the active service list is an Internet Service if no match is detected in response to said comparing, and changing the destination address of the DNS request packet to the DNS service address to be used for the service associated with the Internet Service if one is present in the active service list.

3. A method for directing a DNS request packet comprising:
   maintaining an active service list of services to which a user is logged in, said entries in said list of services associated with a memory including a domain name for each of the services and a DNS service address to be used for each of the services;
   intercepting a DNS request packet having a QName and a destination address;
   comparing the QName to domain names associated with entries in the active service list and, if a match is detected, changing the destination address of the DNS request packet to the DNS service address to be used for the service associated with the matched domain name; and
   sorting entries in the active service list so that said comparing is performed first to the "smallest" entry and last to the "largest" entry.

4. A method in accordance with claim 3, further comprising:
   counting the bits which are set to "1" in a domain subnet mask associated with an address associated with an entry in the active service list in order to determine the relative size of entries in the active service list.

5. A method in accordance with claim 3, further comprising:
   sorting entries in the active service list so that said comparing is performed first to the largest entry and last to the smallest entry.

6. A method in accordance with claim 4, further comprising:
   counting the bits which are set to "1" in a domain subnet mask associated with an address associated with an entry in the active service list in order to determine the relative size of entries in the active service list.

7. A method in accordance with claim 5, further comprising:
   passing the DNS request packet on unmodified if no domain name match is found in the active service list with the QName of the DNS request packet and if no Internet Service is present in the active service list.

8. A method in accordance with claim 6, further comprising:
   passing the DNS request packet on unmodified if no domain name match is found in the active service list with the QName of the DNS request packet and if no Internet Service is present in the active service list.

9. A method in accordance with claim 7, further comprising:
   passing the DNS request packet on unmodified if no domain name match is found in the active service list with the QName of the DNS request packet and if no Internet Service is present in the active service list.

10. A method for directing a DNS request packet to one of a plurality of DNS services, said method comprising:
    maintaining for a user an active service list, said active service list containing entries corresponding to services to which the user is currently logged in, each corresponding service having a domain name, an address of a DNS service to be used for the entry, and a list of address ranges corresponding to the service, each entry in said list of address ranges including an address and a subnet mask;
    determining for each domain name the "largest" entry in said list of addresses;
    sorting said entries in said active service list by "size";
    intercepting a DNS request packet from the user, said DNS request packet having an initial destination address and a QName;
    comparing the QName from the DNS request packet with entries in the active service list in increasing "size" order to determine if the domain name string matches a domain name corresponding to an entry in the active service list and, if it does, substituting the address of a corresponding DNS service to be used for the entry for the initial destination address in the DNS request packet; and transmitting the DNS request packet.

11. A method in accordance with claim 10, further comprising:

deciding that no match exists between the QName from the DNS request packet and any corresponding domain entry in the active service list; and determining if any service in the active service list is an Internet Service and, if it is, substituting the address of a corresponding DNS service to be used for the entry for the initial destination address in the DNS request packet.

12. A method in accordance with claim 10 wherein said determining includes counting bits set to "1" of subnet masks corresponding to entries in said list of addresses.

13. A method in accordance with claim 10 wherein said sorting includes counting bits set to "1" of subnet masks associated with largest address entries for each domain name entry.

14. A method in accordance with claim 11 wherein said determining includes counting bits set to "1" of subnet masks corresponding to entries in said list of addresses.

15. A method in accordance with claim 11 wherein said sorting includes counting bits set to "1" of subnet masks associated with largest address entries for each domain name entry.

16. A method in accordance with claim 12 wherein said sorting includes counting bits set to "1" of subnet masks associated with largest address entries for each domain name entry.

17. An apparatus for intercepting DNS request packets from a user and directing said packets to one of a plurality of DNS services, said apparatus comprising:

a memory for storing at least one service to which the user is currently logged in, each service being associated with a domain name, a DNS service address to be used for the service, and at least one address range including a subnet mask corresponding to the service;

a sorter for sorting the services based on the "size" of the "largest" address range associated with each service;

a packet address modifier, said modifier modifying the destination address of a DNS request packet intercepted by the apparatus by changing the destination address of the packet to a DNS service address corresponding to a match between a QName in the DNS request packet and a domain name associated with one of the services, or in the absence of such a match, to a DNS service address corresponding to an Internet Service if one of the services is an Internet Service.

18. An apparatus according to claim 17 wherein said sorter counts the number of bits set to "1" in the subnet masks of address ranges associated with each service stored in said memory to determine a "largest" address range based on the smallest count of bits set to "1".

19. An apparatus according to claim 17 wherein said sorter counts the number of bits set to "1" in the subnet masks of the "largest" address range associated with each service stored in said memory and reorders the entries in order from smallest to largest so that said modifier checks the smallest address ranges before the larger address ranges.

20. An apparatus according to claim 18 wherein said sorter counts the number of bits set to "1" in the subnet masks of the "largest" address range associated with each service stored in said memory and reorders the entries in order from smallest to largest so that said modifier checks the smallest address ranges before the larger address ranges.

21. A method for directing a DNS request packet, the DNS request packet specifying a source IP address, a destination IP address, and a requested domain name, the method comprising:

determining a proper DNS server to serve the DNS request by examining the requested domain name;

modifying the destination IP address to match an address corresponding to said proper DNS server;

forwarding the modified DNS request packet to said proper DNS server;

maintaining an active service list of services to which a user is logged in, said entries in said list of services associated with a memory including a domain name for each of the services and a DNS service address to be used for each of the services; and wherein said determining comprises determining a proper DNS server to serve a DNS request from said user by examining the requested domain name and looking up said requested domain name in said user's active service list.

22. The method of claim 21, wherein the destination address is not modified if no match is found during said looking up.

23. An apparatus for intercepting DNS request packets from a user and directing said packets to one of a plurality of DNS services, each of the DNS request packets having a requested domain name, the apparatus comprising:

a memory, said memory designed to store at least one service to which the user is currently logged in, each of said at least one service being associated with a domain name, a DNS service address to be used for the service, and at least one address range corresponding to the service;

a packet address modifier, said packet address modifier configured to modify the destination IP address to match an address corresponding to a proper DNS server, said proper DNS server chosen from said domain name service addresses associated with said at least one service.

24. The apparatus of claim 23, wherein said packet address modifier is further configured to abstain from modifying the destination IP address if the requested domain name does not match any of said domain names in said memory.

25. A program storage device readable by a machine, tangibly embodying a program of instructions executable by a machine to perform a method for directing a DNS request packet, the DNS request packet specifying a source IP address, a destination IP address, and a requested domain name, the method comprising:

determining a proper DNS server to serve the DNS request by examining the requested domain name;

modifying the destination IP address to match an address corresponding to said proper DNS server;

forwarding the modified DNS request packet to said proper DNS server;

maintaining an active service list of services to which a user is logged in, said entries in said list of services associated with a memory including a domain name for each of the services and a DNS service address to be used for each of the services; and wherein said determining comprises determining a proper DNS server to serve a DNS request from said user by examining the requested domain name and looking up said requested domain name in said user's active service list.

26. An apparatus for directing a DNS request packet, the DNS request packet specifying a source IP address, a destination IP address, and a requested domain name, the apparatus comprising:

means for determining a proper DNS server to serve the DNS request by examining the requested domain name;

means for modifying the destination IP address to match an address corresponding to said proper DNS server;

means for forwarding the modified DNS request packet to said proper DNS server;

means for maintaining an active service list of services to which a user is logged in, said entries in said list of services associated with a memory including a domain name for each of the services and a DNS service address to be used for each of the services; and wherein said means for determining comprises means for determining a proper DNS server to serve a DNS request from said user by examining the requested domain name and looking up said requested domain name in said user's active service list.

27. The apparatus of claim 26, wherein the destination address is not modified if no match is found during said looking up.

* * * * *